Aug. 21, 1962 W. MUSKULUS 3,050,019
METHOD AND APPARATUS FOR BINDING ELECTRIC
CONDUCTORS AND WINDINGS
Filed Feb. 9, 1959 9 Sheets-Sheet 1

Inventor:
Willi Muskulus
By
Bailey, Stephens & Huettig
Attorneys

3,050,019
METHOD AND APPARATUS FOR BINDING ELECTRIC CONDUCTORS AND WINDINGS
Willi Muskulus, Bergen-Enkheim, Germany, assignor to Firma Balzer & Dröll Schnitt- und Werkzeugbau, Berlin-Enkheim, Germany, a firm of Germany
Filed Feb. 9, 1959, Ser. No. 792,003
Claims priority, application Germany Feb. 11, 1958
15 Claims. (Cl. 112—2)

The present invention relates to a method and apparatus for tying or bandaging together the exposed portions or "heads" of windings which are inserted into the grooves of a stator for an electric machine.

In producing the stators of electric machines which are provided with grooves into which the required windings are to be inserted, it is the usual procedure prior to such insertion to wrap the windings by a mechanical operation with a suitable tape material, and after the insertion to tie or bandage together the outer portions or "heads" of the windings which project laterally from the stator frame by a manual operation. Such a manual method is rather difficult, requires a considerable time, and renders the production of the electric machines very expensive, particularly since, aside from thus bandaging the projecting parts of the main and auxiliary windings, it is also necessary at the same time to tie these windings to each other.

It is the principal object of the present invention to provide a method and apparatus which will overcome these disadvantages and will permit the entire operation of bandaging the windings or winding heads of stators and similar apparatus to be carried out fully automatically.

The method according to the present invention generally consists in tying or bandaging the exposed portions or "heads" of stator windings automatically by means of a continuous thread which is supplied from a suitable bobbin and is formed at regular intervals in accordance with the spacing of the grooves in the stator frame into a series of thread loops which are tied together and extend in a direction substantially transverse to the windings. More specifically, the invention consists in first forming a thread loop at the outside of the winding head, in laying this loop over the winding, in then forming a new thread loop at the inner side of the winding head, in drawing this new loop through the first loop and simultaneously turning the stator frame in one direction at the rate of one groove spacing and tightening the first loop upon the winding, and in then repeating the operating cycle with the second loop forming the new first loop in the following spacing until the entire winding head has been completely bandaged.

This mechanical tying or bandaging operation may be carried out by means of an apparatus according to the invention which comprises a hooked needle which is rotatable about its longitudinal axis and also adapted to be reciprocated in its axial direction, and which is operatively associated with a thread guide and a thread pickup member. The thread guide extends coaxially with respect to the hooked needle and is rotatably and adjustably mounted at a certain distance from the needle mounting, while the thread pickup member surrounds the needle and is axially slidable as well as rotatable relative to the needle. The hooked needle, the thread guide and the thread pickup member are driven by separate driving means which, however, are actuated in a predetermined timed relation to each other. The stator frame with its winding is adapted to be mounted in a device which is located in a position so that the winding portions or winding "heads" which project laterally from the stator frame and are to be bandaged will be disposed between the needle mounting means and the thread guide. According to another feature of the present invention, the tools for carrying out the bandaging operation, namely, the hooked needle, the thread guide, and the thread pickup member, are mounted on a longitudinal slide which is slidable on a machine frame, while the device for holding the stator frame is rotatably mounted and arrestable in predetermined rotary positions on a cross slide which is adjustable in a direction transverse to the movement of the longitudinal slide and adapted to be locked in an operative and an inoperative or loading position. The longitudinal slide is further adapted to be reciprocated in a timed relation to the movement of the cross slide, and the device for holding the stator frame is rotatable by a driving mechanism through certain fixed distances in accordance with the spacing of the grooves in the stator frame and in a predetermined timed relation with the movements of the longitudinal slide and the tools thereon.

Another important feature of the invention consists in the fact that all of the means for driving the tools and slides and the device for holding the stator frame are operatively associated with each other in such a manner that the movements required for the tying or bandaging operation are positively controlled and carried out in an automatic operating cycle, and are actuated by a single driving motor.

Since the winding portions or "heads" to be tied or bandaged project at both sides of a stator frame, the present invention further provides a longitudinal slide with a hooked needle, a thread guide, and a thread pickup member thereon at each side of the device for receiving and holding the stator frame, and driving means for operating the two longitudinal slides in the same rhythm but in a motion reverse to each other.

These and further objects, features, and advantages of the present invention will become more apparent from the following detailed description thereof, particularly when read with reference to the accompanying drawings, in which:

FIGURE 5a shows a cross section taken along line Va—Va of FIGURE 5;

FIGURE 10 shows a side view similar to FIGURE 4 of a modification of the apparatus according to the invention in which the thread pickup member is omitted; while

Figure 1:
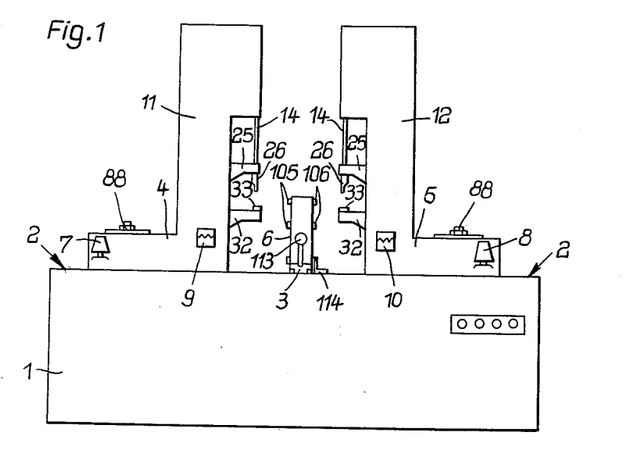
FIGURE 1 shows a front view of the bandaging apparatus according to the invention.
Figure 2:
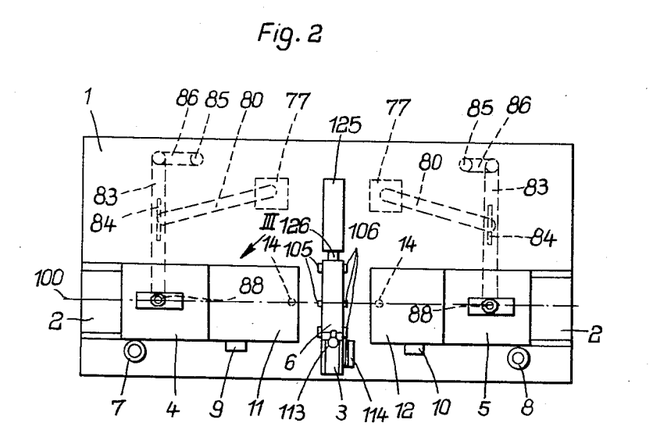
FIGURE 2 shows a plan view thereof.

Referring to the drawings, and first particularly to FIGURES 1 and 2, the apparatus for tying or bandaging the outwardly projecting portions or "heads" of windings which are inserted into the grooves of a stator body of an electric machine comprises a machine frame having a longitudinal bed 2 and a transverse bed 3 thereon. The longitudinal bed 2 supports two longitudinal slides 4 and 5, while the transverse bed 3 supports a cross slide 6 intermediate the longitudinal slides and a device on or within the cross slide for receiving a stator frame. The front side of each longitudinal slide 4 and 5 is provided with a bobbin of thread 7 or 8 and a thread-gripping or clamping device 9 or 10, respectively. Each longitudinal slide 4 and 5 also has a stand 11 or 12 rigidly secured thereto which forms a frame in which the operating tools and some of their driving elements are mounted.

Figure 3:
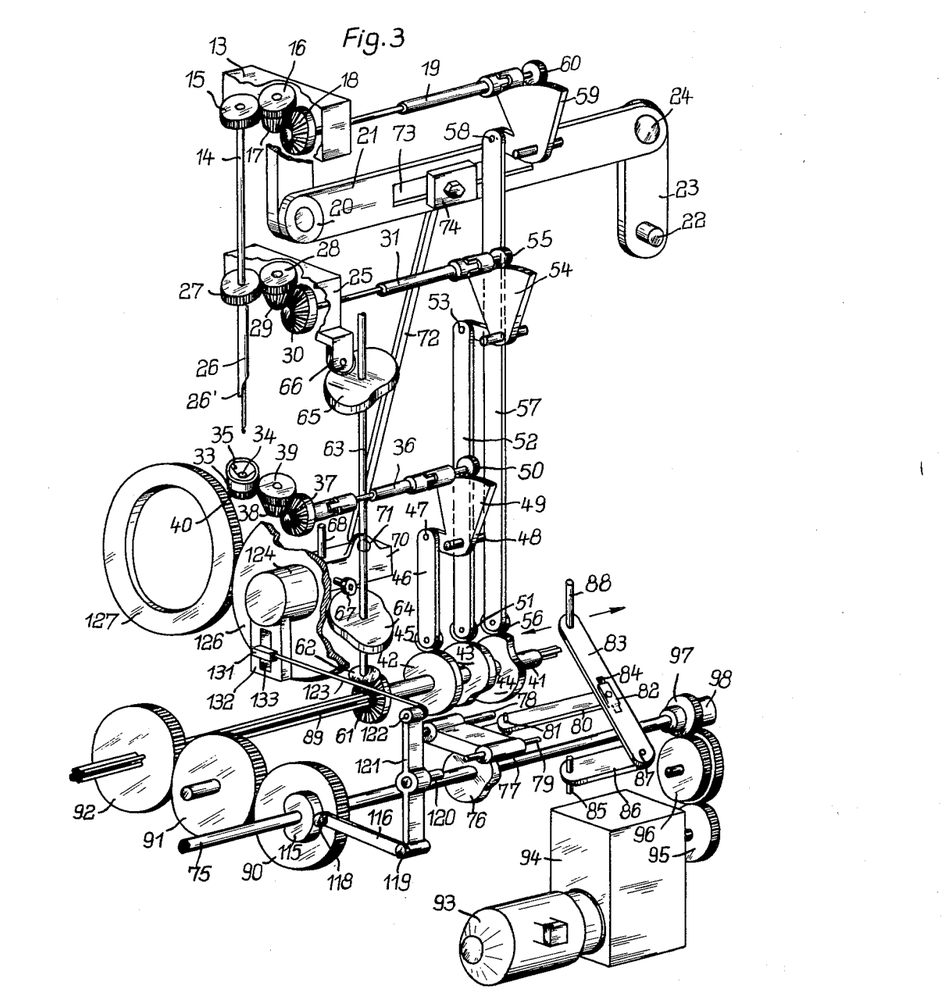
FIGURE 3 shows a diagrammatic perspective view of the driving mechanism of the apparatus.

Since each longitudinal slide supports the same elements, they only need to be described with reference to one slide, that is, slide 4 with stand 11 thereon, as illustrated particularly in FIGURES 3 and 4, in which FIGURE 3 is a view of the apparatus as seen in the direction shown by the arrow III in FIGURE 2.

Figure 4:
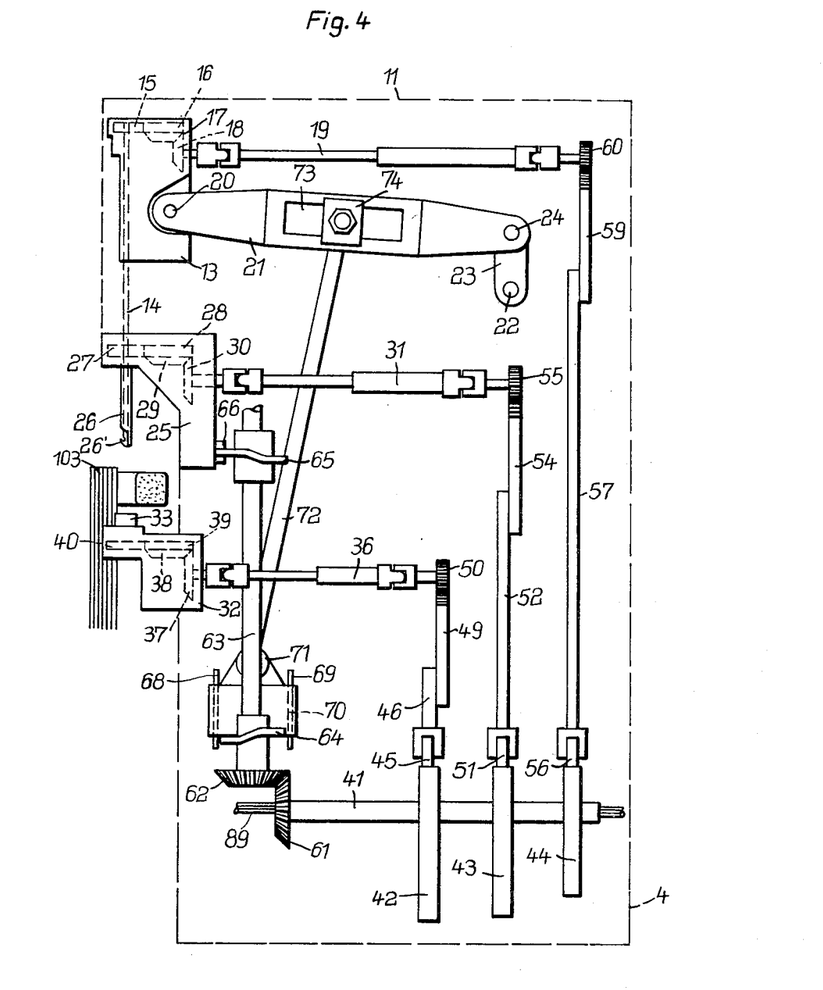
FIGURE 4 shows a diagrammatic side view of the tool driving mechanism.

Stand 11, which for the sake of clarity is omitted in FIGURE 3 and only indicated in dotted lines in FIGURE 4, supports therein a housing 13 so as to be adjustable in a vertical direction. Housing 13 has a hooked needle 14 rotatably mounted therein and projecting downwardly from the housing. The upper end of needle 14 carries a gear wheel 15 which may be driven by a universal-joint shaft 19 through intermediate gears 16, 17, and 18 so as to turn needle 14 about its own axis. A lever 21, which is pivotably mounted on housing 13 by means of a pivot pin 20, and driven in a manner as subsequently described is adapted to reciprocate the housing and the needle 14 therein in the axial direction of the needle. Lever 21 is swivably mounted on stand 11 by means of a link 23 which is pivotably connected to the stand and to lever 21 by pivot pins 22 and 24, respectively. In order to comply with the vertical movements of housing 13, shaft 19 is made of a telescopic structure so as to be of a variable length.

Underneath the housing 13 and at a suitable distance therefrom and in line therewith, a further housing 25 is mounted on stand 11 so as to be adjustable in the axial direction of needle 14. In this housing 25 tubular thread pickup member 26 is rotatably mounted which coaxially surrounds needle 14 and has a downwardly extending nose 26'. This thread pickup member 26 may be turned about its axis by means of a gear wheel 27 secured to its upper end which is rotatable by a universal-joint shaft 31 through intermediate gears 28, 29, and 30 which are likewise mounted in housing 25. The vertical movements of housing 25 and thus also of thread pickup member 26 are effected by a control element as subsequently described. In order to comply with the movements of housing 25, shaft 31 is likewise made of a telescopic structure so as to be variable in length.

A third housing 32 is adjustably secured on stand 11 and supports a thread guide 33 so as to be rotatable coaxially to needle 14. This thread guide 33, as shown particularly in FIGURE 6, has a central bore 34 and a channel 35 extending obliquely upwardly from bore 34. Thread guide 33 has a gear rim 40 which may be turned by a universal-joint shaft 36 through intermediate gears 37, 38, and 39 which are mounted in housing 32. Shaft 36 is likewise telescopically slidable similar to shafts 19 and 31.

Shafts 19, 31, and 36 are driven by an auxiliary drive shaft 41 which is rotatably mounted within the lower part of the longitudinal slide 4 and carries three cam disks 42, 43, and 44. Cam disk 42 is associated with thread guide 33, cam disk 43 with thread pickup 26, and cam disk 44 with needle 14. Cam disk 42 acts upon a roller 45 mounted on an arm 46 which is slidable within suitable supporting means, not shown, and is pivotably connected at its upper end by a pin 47 to a toothed segment 49 which is pivotably mounted on stand 11 and in mesh with a pinion 50 on shaft 36. The driving motion of cam disk 43 is similarly transmitted to shaft 31 through a roller 51, arm 52, pivot pin 53, toothed segment 54, and pinion 55, while the driving motion of cam disk 44 is transmitted to shaft 19 through a roller 56, arm 57, pivot pin 58, toothed segment 59, and pinion 60.

The vertical movements of housings 13 and 25 containing needle 14 and thread pickup 26 must proceed in a certain timed relation to the rotary movements of needle 14, thread guide 33, and thread pickup 26. Housings 13 and 25 are therefore preferably likewise driven by the auxiliary drive shaft 41 and in synchronism with cam disks 42, 43, and 44. For this purpose, shaft 41 carries a bevel gear 61 which is in mesh with a bevel gear 62 on a vertical shaft 63 which is rotatably mounted on stand 11. This shaft 63 carries two control members, for example, two wobble plates 64 and 65. When shaft 63 is being rotated, wobble plate 65 will act upon a roller 66 to reciprocate housing 25 in a vertical direction, while wobble plate 64 will act upon a roller 67 to move a crosshead 70 which is slidable in a vertical direction on guide rods 68 and 69, which are mounted on stand 11. Crosshead 70 is pivotably connected by a pivot pin 71 to a connecting rod 72 which is pivotably connected to lever 21 by means of a bearing member 74 which may be adjusted in a longitudinal direction in a slot 73 and may be secured to lever 21 in the adjusted position.

For carrying out the bandaging operation, each longitudinal slide 4 and 5 must be reciprocated in a certain timed relation with the tools mounted in stands 11 and 12 and with the driving elements thereof which are mounted on the longitudinal bed 2. For this purpose, a drive shaft, for example, the main drive shaft 75, is provided with a suitable control element, for example, a wobble plate 76, which is adapted to reciprocate a crosshead 77 in a horizontal direction. Crosshead 77 is slidably mounted on guide rods 78 and 79 within machine frame 1 and it has one end of a connecting rod 80 pivotably mounted thereon by a pin 81. The other end of connecting rod 80 is connected to a lever 83 by means of a bearing 82 which is adjustable within a slot 84 extending in the longitudinal direction of lever 83. Lever 83 is, in turn, pivotably connected at one end 87 to a link 86 which is rotatable about a pin 85 on machine frame 1. The other end of lever 83 is pivotably connected by a pin 88 to the longitudinal slide 4 or 5, respectively.

The auxiliary drive shaft 41 which is mounted within the longitudinal slide 4 or 5 and is moved in accordance with the movements of the latter, forms a hollow shaft, which is keyed on a splined shaft 89 mounted in machine frame 1 and thus slidable longitudinally thereon. Splined shaft 89 is driven through gear wheels 90, 91, and 92 by the main drive shaft 75 which, in turn, is driven by a motor 93 through a governor 94, intermediate gears 95, 96, and 97, and a clutch 98.

Figure 5:
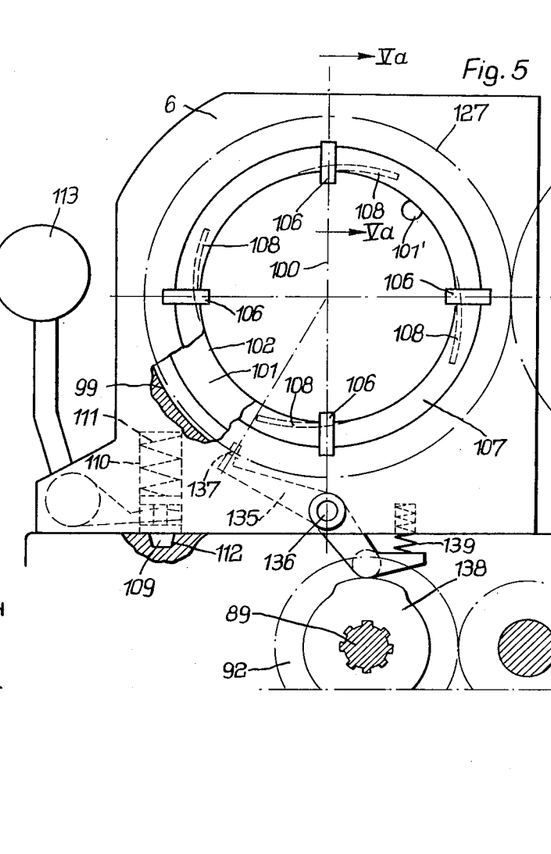
FIGURE 5 shows a side view of the device for receiving and mounting the stator frame and of the driving mechanism therefor.
Figure 5A:
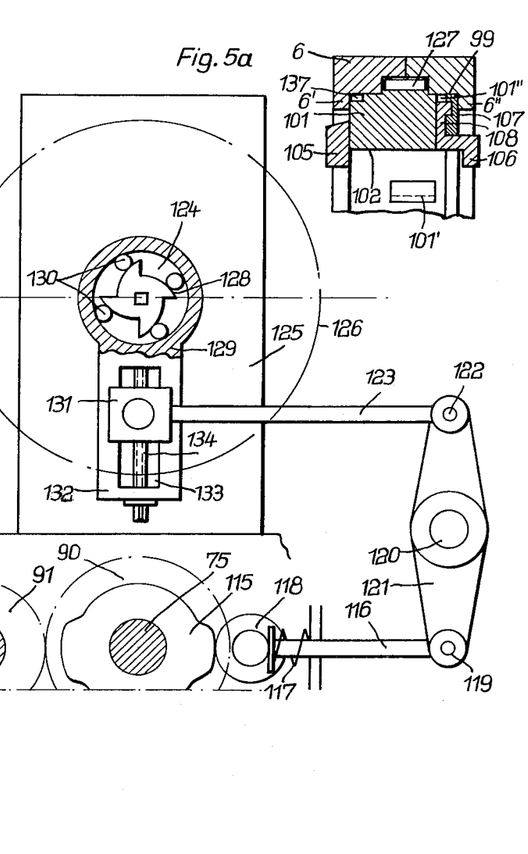
Figure 8:
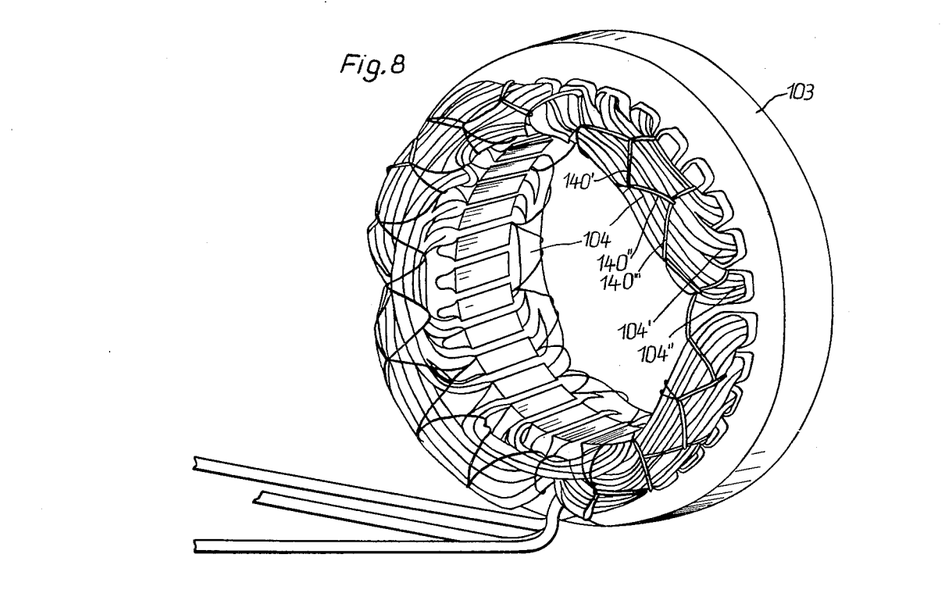
FIGURE 8 shows a perspective view of a completely bandaged stator.

Cross slide 6 which is mounted on transverse bed 3 between the longitudinal slides 4 and 5 and is adjustable in a direction transverse to slides 4 and 5 forms an upright which is split and bolted in the longitudinal direction and has a horizontal central bore 99, as shown in FIGURE 5, the axis of which coincides in the operative position of cross slide 6 with the vertical longitudinal plane 100 (FIGURES 2 and 5) extending through needle 14. Bore 99 contains a ring 101 which is rotatably mounted coaxially with bore 99 between lateral flanges 6' and 6", as shown in FIGURE 5a. This ring 101 has an opening 102 for receiving the stator frame 103, as shown in FIGURE 8, the projecting winding portions or heads 104 of which are to be bandaged. At one end surface, ring 101 has a plurality of abutments 105 rigidly secured thereto which extend a short distance over the edge of the opening 102, while at its other end surface ring 101 carries a plurality of abutments 106 which are adjustable in radial directions of the ring by a separate setting ring 107 which is rotatably mounted between ring 101 and flange 6" and has arcuately-shaped guides 108 which are associated with abutments 106 in such a manner that, when the setting ring is turned in a clockwise direction, guides 108 will move abutments 106 inwardly over the edge of opening 102, while when setting ring 107 is turned in the opposite direction, abutments 106 will move outwardly to clear the opening. When the stator frame 103 is inserted into opening 102 it will be locked against rotation relative to ring 101 by a projection 101' on the inner surface of ring 101 which may engage, for example, into the setting groove as usually provided in stator plates.

In order to facilitate the insertion of the stator frame into ring 101, cross slide 6 may be withdrawn from the area of longitudinal slides 4 and 5. For this purpose, a locking bolt 109 is provided which may be fixed in its operative position and is slidable under the action of a spring 111 within a bore 110 in cross slide 6 to engage into a bore 112 in the machine frame 1. A hand lever 113 which is pivotably mounted on cross slide 6 engages with locking bolt 109 so that when lever 113 is pivoted downwardly, it lifts bolt 109 out of bore 112 to release cross slide 6 for movement on transverse bed 3.

Such movement is preferably coupled with an automatic rotation of setting ring 107 so that the abutments 106 will release the stator frame. For this purpose, an abutment 114, as indicated in FIGURES 1 and 2, is mounted on machine frame 1 adjacent to the transverse bed 3, and a suitable pawl or the like, not shown, provided on setting ring 103 is adapted to engage with abutment 114 and will be moved thereby when cross slide 6 is shifted to its inoperative position, whereby setting ring 103 will be positively turned in a counterclockwise direction and the abutments 106 on setting ring 107 will be shifted outwardly by guides 108 (FIGURE 5). When cross slide 6 is shifted back to its operative position, the pawl will be moved in the opposite direction by its engagement with abutment 114 and until its release therefrom, whereby the abutments 106 on setting ring 107 will be shifted inwardly to grip the stator frame within ring 101.

In order to turn the stator frame 103 automatically in accordance with the spacing of the grooves therein and thus also in accordance with the spacing of the windings and the movements of the tools, ring 101 will be driven by a driving mechanism which includes a control member, for example, a cam disk 115 which is mounted, for example, on the main drive shaft 75, as shown in FIGURES 3 and 5, and acts upon a roller 118 on a rod 116 which is slidably mounted on a part of machine frame 1 and acted upon by a spring 117 to maintain roller 118 in constant engagement with cam disk 115. Rod 116 is pivotably mounted on one end 119 of a two-armed lever 121 which is mounted on a pivot pin 120 on machine frame 1 and the other end 122 of which is pivotally connected to a rod 123 which leads to a freewheel clutch 124 which is associated with a gear wheel 126 mounted in a housing 125 on the machine frame 1. When the cross slide 6 is in its operative position, this gear wheel 126 engages with a gear rim 127 mounted on ring 101. Freewheel clutch 124 may be of a conventional design consisting of a star-shaped member 128 which is coaxial and rigidly secured to gear wheel 126 and surrounded by a sleeve 129 which is rotatably mounted in housing 125. A plurality of freely movable balls or rollers 130 are disposed between sleeve 129 and member 128 so that, if sleeve 129 is rotated in a clockwise direction, balls or rollers 130 will slide between these two elements and wedge the same firmly to each other whereby gear wheel 126 will likewise be rotated. If sleeve 129 is rotated in the opposite direction, balls or rollers 130 will disengage from the star-shaped member 128 and thereby release the former connection so that the return movement of sleeve 129 will be free-wheeling and gear wheel 126 will remain in a stopped position. For moving sleeve 129 back and forth, rod 123 is connected by an adjustable bearing 131 to a lateral extension 132 of sleeve 129. Bearing 131 is slidably adjustable within an elongated recess 133 in the extension 132 by means of a threaded spindle 134.

In the particular embodiment of the invention as shown in FIGURES 1 to 8, the stator frame 103 and the longitudinal slide 4 are driven in such a timed relation to each other that behind each second groove of the stator frame, as shown in FIGURE 8, a thread loop 140', 140''' will be formed behind the winding head 104, and between these grooves, that is, staggered by one groove, a thread loop 140'' will be formed in front of the winding head, and that the hooked needle 14 can then pass into the space formed between two strands of windings, for example, between 104' and 104''. However, the bandaging operation may also be carried out at a greater or smaller spacing which may be predetermined by providing a suitable control element, for example, a different cam disk 115, for driving the gear wheel 126 and/or by varying the stroke length of the free-wheeling sleeve 129 by adjusting the position of bearing 131.

In order to lock the ring 101 in its operative position when gear wheel 126 is not being turned and also when cross slide 6 is being shifted from its operative position to its forward inoperative position, the apparatus is further provided with a releasable lock, for example, a locking pawl 135. This locking pawl is mounted so as to be pivotable about a pin or shaft 136 on cross slide 6 and is movable only in phase with the movements of the freewheel clutch 124. Locking pawl 135 is adapted to engage into suitable recesses 137 in ring 101 which are provided in accordance with the spacing of the grooves in the stator body 103. Its operation is controlled by a suitable control element, for example, a cam disk 138 which is mounted on the splined shaft 89. The cam heads of cam disk 138 are so disposed in the direction of rotation relative to the cam heads of cam disks 115 that, when sleeve 129 is freewheeling, the gear wheel 127 and thus also the ring 101 will be locked. In the operative position of the cross slide, a compression spring 139 acting upon locking pawl 135 maintains the latter in constant engagement with cam disk 138, whereas when cross slide 6 is being shifted to the forward released position, locking pawl 135 will disengage from cam disk 138 and remain in locking engagement in one of the recesses 137 in ring 101.

It will be understood that all of the movements of the tools, the slides, and ring 101 must occur in an accurately timed relation to each other. This is attained by the design and position of the cam disks and wobble plates and by the adjustability of the leverages by means of the adjustable bearings, for example, bearings 74, 82, and 131 between the members 21 and 72, 80 and 83, and 123 and 132, respectively.

Figure 6:
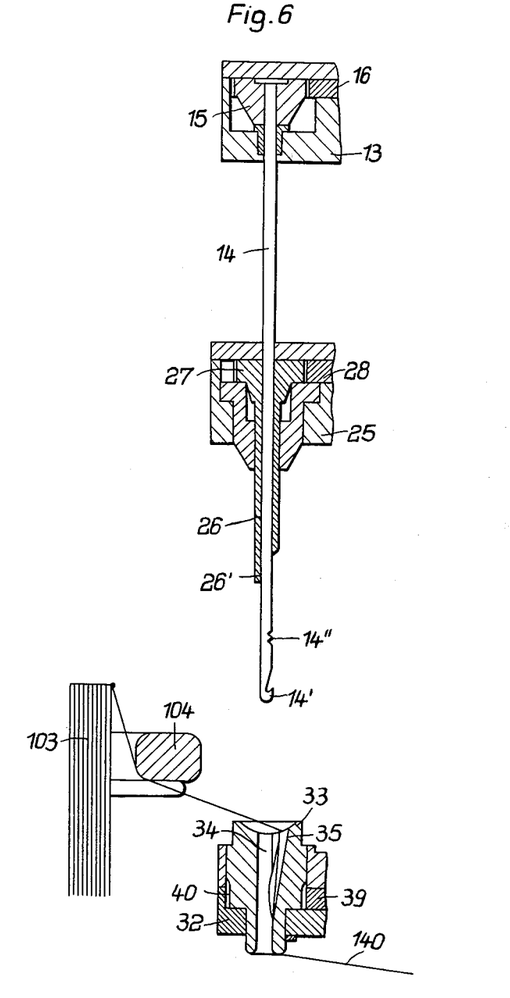
FIGURE 6 shows a central vertical section of the bandaging tools.
Figure 7:
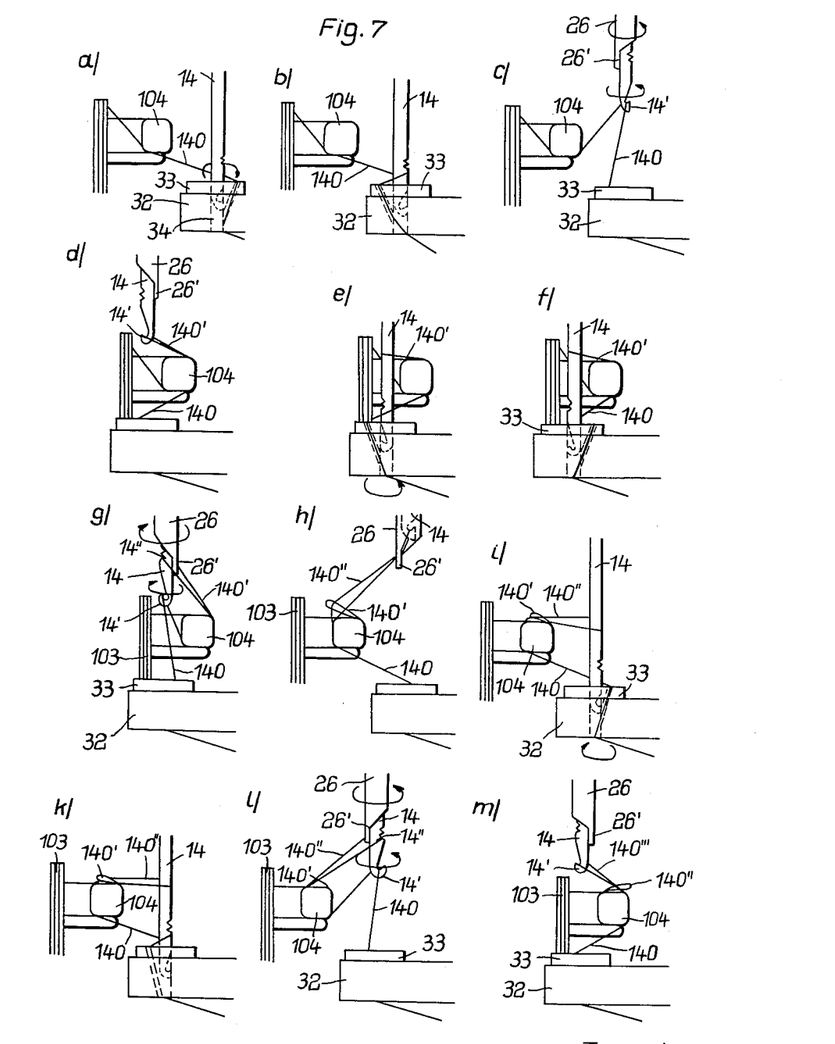
FIGURE 7 illustrates diagrammatically the individual operating cycles or stages of forming the bandaging loops and of tying them to each other.

The operation of forming the thread loops and of tying them together to form the bandage will now be described with reference to the individual operating stages *a* to *m* as illustrated in FIGURES 6 and 7.

FIGURE 6 shows the starting position of the tools of the longitudinal slide 5 at the right side of FIGURES 1 and 2. Slide 5 is then in its right-hand end position and cross slide 6 in its operative position with the stator frame 103 being inserted into ring 101, so that gear wheels 126 and 127 are in engagement with each other. The starting end of thread 140 is passed from the supply bobbin 8 through the thread-clamping device 10 and then from below through the channel 35 of thread guide 33, then further underneath the winding head 104 facing upwardly in ring 101 to the outer edge of stator frame 103 or ring 101 where it may be gripped in any suitable manner. Thereupon the motor 93 is switched on. The engagement of clutch 98 will then start the automatic cycle of forming the thread loops, of tying them together, and of thus bandaging the winding heads.

In stage *a* according to FIGURE 7, needle 14 passes into the central bore 34 of thread guide 33 and the latter is turned at least 180° so that, in stage *b*, thread 140 will be looped around the shaft of needle 14 so as to be taken along by hook 14' when needle 14 then moves upwardly in stage *c*. During this return stroke of the needle, the clamping device 10 is released so that new thread may be drawn. If the needle has reached its upper end position, it will in stage *d* be turned together with the thread pickup 26 at an angle of 180° about its longitudinal axis; the clamping device 10 will again close; and longitudinal slide 5 will be shifted to such an extent relative to cross slide 6 that the axis of needle 14 will lie between the winding head 104 and the stator frame 103. The thread loop 140' which is thereby formed will then be placed over winding head 104. At the same time, the stator frame will be turned in the cross slide by one spacing so that the loop will be placed slightly oblique on the winding. In stage *e*, needle 14 will again pass into thread guide 33, and loop 140' will slide upon the shaft of the needle. Thread guide 33 will thereupon in stage *f* be turned back by at least 180° whereby thread 140 will again loop about needle 14 as in stage *b*, but from the opposite side. During the following return stroke of needle 14 according to stage *g*, thread 140 will slide again into hook 14' and be taken along by the hook while at the same time clamping device 10 will be opened. The first loop 140' then slides downwardly along the needle until the loop tip engages into a notch 14" in the shaft of the needle so that it will now likewise be taken along by the needle and pass into the vicinity of the thread pickup 26, which during this stage has been moved downwardly, whereby its nose 26' will pass into loop 140'. The thread pickup 26 then turns back 180° and the needle moves to its upper end position. The rotation of pickup 26 causes the first-formed loop 140' to be picked up from needle 14 by nose 26', and loop 140' then slides over the second loop 140" formed in stage *g* and up to winding head 104. Near its upper end position, needle 14 will then in stage *h* again be turned back 180°, and at the same time the longitudinal slide 5 will return to its right-hand end position. Simultaneously with the return movement of longitudinal slide 5 to its right-hand end position, stator frame 103 will be advanced by one spacing in the cross slide 6, whereby the first loop 140' will be tightened in an oblique position on the winding head 104.

The loop forming cycle with the loop being formed in front of the winding is then repeated in the following stages starting with stage *i* which corresponds to stage *a*, except insofar as the second loop 140" now formed slides along the shaft of needle 14 until, after the formation of a further loop 140''' in stages *k* and *l* corresponding to stages *b* and *c*, and after the rotation of needle 14 and thread pickup 26 and after the forward movement of the longitudinal slide and the further turning of the stator body during stages *l* and *m*, this second loop 140" slides over loop 140''' and is tightened upon the winding. The position of the tools and slides then again corresponds to that in stage *d*.

The operation of forming the loops and tying them together is continued until all of the winding heads projecting from the stator frame have been securely bandaged, resulting in an appearance as shown in FIGURE 8. After the end of the thread coming from the supply bobbin has been cut off, the start and end of the thread are knotted together.

Figure 9:
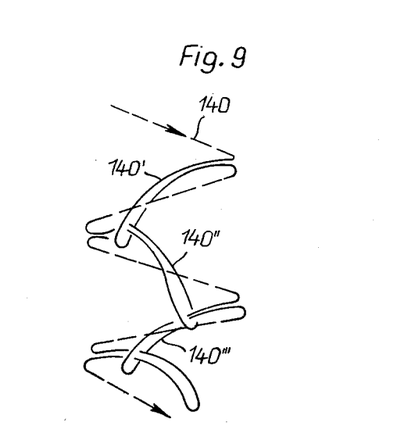
FIGURE 9 illustrates diagrammatically the path of the bandaging thread.

FIGURE 9 illustrates a part of the thread path with the loops 140', 140", 140''' being disposed within the same plane and with the dotted lines indicating the thread underneath the winding head and the fully drawn lines indicating the thread path on the winding head.

Figure 10:
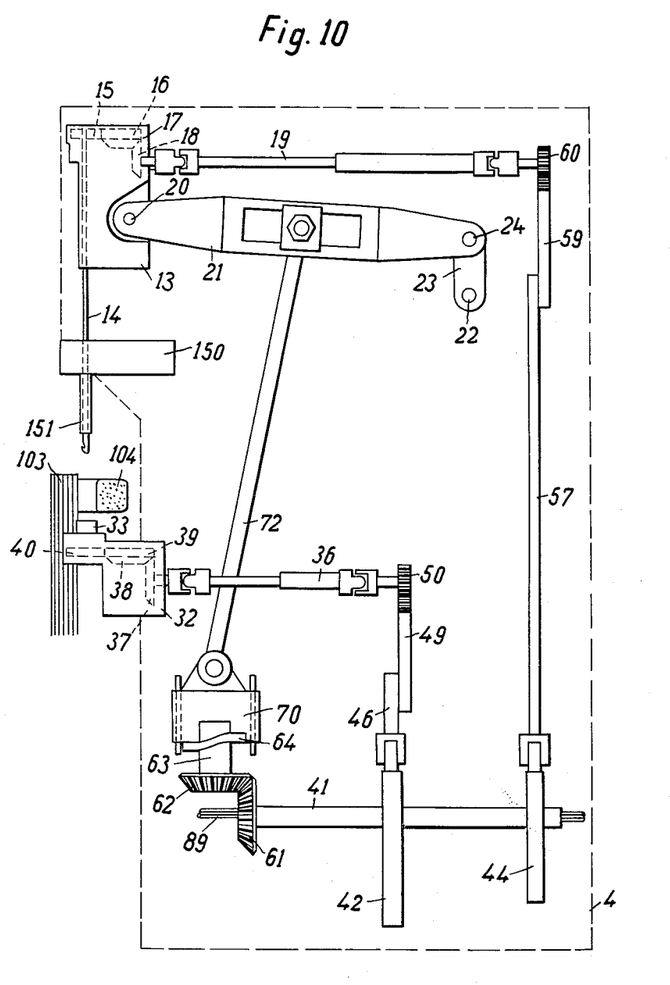

The thread loops 140', 140", 140''', etc. may also be formed and tied together by a more simplified embodiment of the apparatus according to the invention, namely, one without the thread pickup 26. This simplified embodiment is illustrated in FIGURE 10 in which certain elements shown in the first embodiment according to FIGURES 3, 4, and 6 are omitted, namely, the thread pickup 26 with its housing 25, gear wheels 27 to 30, members 45 to 50 and 36, and cam disk 43, and in which in place of housing 25 a bearing block 150 is provided which is mounted on slide 4 so as to be adjustable in the axial direction of needle 14. Bearing block 150 carries a tube 151 for guiding the hooked needle 14 which, in turn, has an entirely smooth shaft without the transverse notches 14", as shown in FIGURE 6. If the needle can be made relatively short or of a sufficient strength, it is even possible to omit the bearing block 150 with the guide tube 151.

As compared with the operation previously described of forming the loops and of tying them together by means of the thread pickup, in which the rotation of the needle is always carried out above the winding head 104, the rotation of the needle according to the embodiment shown in FIGURE 10 is already carried out at the time of the withdrawal of the needle from the thread guide 33 or shortly thereafter. For this purpose it is necessary to make a suitable adjustment of the cam disk 44 which controls the rotary movement of the needle. By such an earlier rotation of the needle, the free end of the thread loop through which the next loop has to be passed will be placed upon the back of the needle and may slide off the needle and over the following loop without requiring a thread pickup member.

Figure 11:
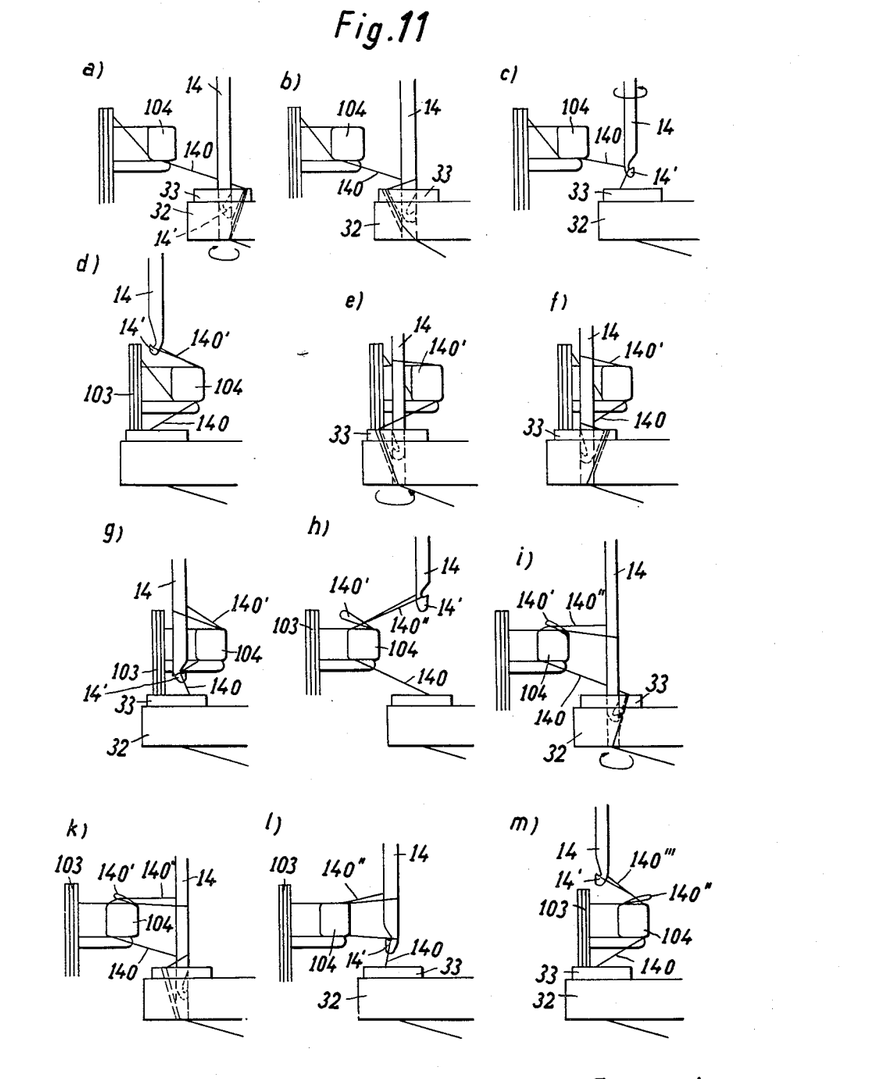
FIGURE 11 is an illustration similar to FIGURE 7 showing the individual operating stages of the tools of the modified apparatus according to FIGURE 10.

The method of forming the loops merely by means of a smooth hooked needle 14 and the thread guide 33, and of tying them together will now be described with reference to FIGURE 11 illustrating the main stages *a* to *m* of the operation.

In the starting stage *a*, needle 14 has just entered into the central bore in thread guide 33 in front of the winding head 104 and with hook 14' facing away from the latter. Thread guide 33 then turns approximately 180°, whereby in stage *b* thread 140 will be layed around the shaft of the needle. In stage *c* needle 14 is moved upwardly to such an extent that it will be above the winding head 104, and thread 140 is thereby engaged and taken along by hook 14'. Immediately or shortly after the needle has left the thread guide 33, the needle will then be turned approximately 180° so that hook 14' will now face toward the winding head. During the following stage *d*, needle 14 and thread guide 33 will be moved so far toward the stator frame 103 that the needle will be behind the winding head 104. Thus, the first loop 140' has been formed and placed over the winding head. During the next stage *e*, needle 14 again passes into the thread guide 33 which is then again turned back approximately 180° so that thread 140 will again be placed around the needle shaft, as shown in stage *f*. In this stage, the first loop 140' remains in its previous position and the needle passes downwardly through this loop. The following stage *g* corresponds to stage *c*. Needle 14 leaves the thread guide 33 in the upward direction, thereby catches thread 140 and turns back approximately 180° so that hook 14' again faces toward the winding head 104 and loop 140' then lies on the smooth back of the needle hook. During the further upward stroke of the needle, loop 140' slides off the needle, and the new loop 140" formed by the needle is pulled through the first loop 140'. In stage *h*, needle 14 and thread guide 33 will again be in front of the winding head 104, and hook 14' of the needle faces away from the winding head. Stator frame 103 is simultaneously advanced by the predetermined spacing. After needle 14 has then passed into thread guide 33, it will be in stage *i* which corresponds to the starting stage *a*, except for the fact that loop 140" now lies on the shaft of the needle and loop 140' is drawn tight in an oblique position on the winding. The operation then continues in the stages following stage *i* in the same manner as in stages *b* to *h*, as illustrated by the first few stages *k* to *m*.

It will thus be seen that, when using a smooth hooked needle and turning it immediately or shortly after leaving the thread guide, the previously formed loop may also slide off the needle and be layed over the next drawn loop without requiring a thread pickup member.

The thread-clamping device required for producing the necessary thread tension may be of various types generally known in the art and therefore does not need to be specifically shown or described. It may, for example, consist of a pair of clamping jaws which may be opened and closed at the required interval by suitable control means actuated, for example, by the auxiliary drive shaft 41.

Although the bandaging operation according to the invention has been described with respect to only one side of a stator frame, it will be evident that the same operation may be carried out simultaneously on the other side thereof by means of the tools of the other longitudinal slide 4, and further that both longitudinal slides should be operated in phase opposition so that the tensions occurring by the formation and tying of the loops will always be opposed to each other, and the windings will not be shifted or displaced within the grooves of the stator frame.

By the provision of suitable end stops and electric control elements which may be of any suitable design known in the art for carrying out automatic control operations and which have not been shown in the drawings as they would render them too complex, the apparatus according to the invention may be automatically switched off after the bandaging operation has been completed and when the longitudinal slides and the tools thereon are in their outermost end positions. Cross slide 6 is then unlocked by hand by means of the hand lever 113 and withdrawn from the vicinity of the longitudinal slides. As already stated, the stator body is automatically released at this withdrawal movement so that it may then be removed from ring 101 and a new stator body be inserted therein.

Although my invention has been illustrated and described with reference to the preferred embodiments thereof, I wish to have it understood that it is in no way limited to the details of such embodiment, but is capable of numerous modifications within the scope of the appended claims. Thus, for example, the cam disks and wobble plates described herein may be replaced by other suitable control elements, for example, eccentric disks or grooved disks, and the ring and its associated elements for mounting the stator body may also be replaced by any other suitable mounting means, and these means may also be designed and driven so as to permit elongated elements, for example, cables, or ring-shaped windings without cores or stator frames to be tied or bandaged along their entire circumference. Also, in place of adjustable bearings for varying the various leverages and for thus adjusting the various control movements, it is also possible to apply other mechanical means known in the art.

Having thus fully disclosed my invention, what I claim is:

1. An apparatus for bandaging the free portions of windings inserted into the grooves of a stator frame and projecting laterally from said frame, comprising a housing, a hooked needle rotatably mounted on said housing and adapted to reciprocate in its axial direction and constituting a first tool, a second housing, a thread guide rotatably mounted on said second housing coaxial to said needle and constituting a second tool, said needle adapted to reciprocate into and out of said thread guide, a third housing, a thread pickup member coaxially surrounding said needle and mounted on said third housing and constituting a third tool, means for rotatably mounting said pickup member and for sliding the same in the axial direction of said needle, means for driving said first, second and third tools, in a predetermined timed relation to each other, means for receiving and mounting the stator frame so that said winding portions will be disposed at a point between said housings for mounting the needle and the thread guide, and means for rotating said stator receiving means at timed intervals in accordance with the position of said winding portions to be bandaged and the spacing between them and in a predetermined timed relation with the operation of said driving means.

2. An apparatus as defined in claim 1, further comprising a machine frame, at least one slide member slidable longitudinally on said frame and supporting said housings, means for mounting said stator receiving means on said frame, and means for reciprocating said slide member at predetermined intervals toward and away from said stator mounting means in accordance with said spacing between adjacent winding portions and the operation of said driving means.

3. An apparatus as defined in claim 2, wherein said stator mounting means comprises a cross slide member mounted on said machine frame and adjustable in a direction transverse to said longitudinal slide.

4. An apparatus as defined in claim 2, wherein said means for reciprocating said longitudinal slide member comprise a motor, a main drive shaft driven by said motor, a wobble plate mounted on said drive shaft, a crosshead controlled by said wobble plate, and adjustable lever means actuated by said crosshead.

5. An apparatus as defined in claim 1, wherein said means for driving said first, second and third tools include a motor, a main drive shaft driven by said motor, a splined shaft driven by said main shaft, a hollow shaft axially adjustable on said splined shaft, cam disks mounted on said hollow shaft, lever means actuated by said cam disks, and universal-joint shafts and gear wheels connecting said lever means to said tools.

6. An apparatus as defined in claim 1, wherein said means for driving said tools include means for reciprocating said needle and said thread pickup means in the axial direction of said needle comprising a motor, a main drive shaft driven by said motor, a splined shaft driven by said main shaft, a hollow shaft axially adjustable on said splined shaft, wobble plates driven by said hollow shaft, and lever means actuated by said wobble plates and connected to the housings of said needle and thread pickup means so as to move said housings and thereby to reciprocate said needle and thread pickup means.

7. An apparatus as defined in claim 2, wherein said means for rotating said stator receiving means comprise a motor, a drive shaft adapted to be driven by said motor, a cam disk mounted on said shaft, lever means adapted to be actuated by said cam disk, a freewheel clutch adapted to be actuated by said lever means, a gear wheel associated with said free wheel clutch, said stator receiving means comprising an annular member having a plurality of spaced recesses in the periphery thereof corresponding to the distance between adjacent projecting winding portions on said stator frame to be mounted within said annular member, gear means on said annular member in engagement with said gear wheel, and means for locking said annular member at predetermined intervals, said locking means comprising a cam disk mounted on said shaft, and a pawl having one end in engagement with and controlled by said last cam disk, and having another end adapted intermittently to engage into and disengage from said recesses to lock and unlock said annular member in accordance with the rotation of said shaft.

8. An apparatus as defined in claim 7, wherein said stator receiving means comprise an annular member having a plurality of stops at both end surfaces of said member extending radially thereof and projecting inwardly beyond the central aperture of said member, said stops at one end surface of said member being rigidly secured thereto, said stops at the other end surface being adjustable in a radial direction, and a setting ring rotatably mounted on said cross slide member concentrically to said annular member and having means thereon engaging with said movable stops for radially adjusting said movable stops between one end position in which said movable stops project inwardly over the edge of said central aperture, and another end position in which said movable stops are moved outwardly to clear said aperture.

9. An apparatus as defined in claim 8, further comprising an abutment on said machine frame, means on said setting ring adapted to engage with said abutment when said cross slide member is shifted from one end position to the other end position to turn said setting ring, said gear means on said annular member being adapted to engage with said gear wheel of said free wheel clutch when said cross slide member is being shifted to one end position and to disengage therefrom when said cross slide member is shifted to the other end position.

10. An apparatus for bandaging the free portions of windings inserted into the grooves of a stator frame and projecting laterally from said frame, comprising support rotatable about an axis and having means thereon for holding a stator frame having windings thereon, a frame movable towards and from said support, a hooked needle mounted in said frame for turning about its axis and for longitudinal sliding movement in a direction parallel to the axis of rotation of the support, a thread guide mounted in said frame for turning movement about the needle axis and having an opening therein aligned with the needle into which the needle can extend, means to reciprocate the needle, when the frame is remote from the support and the needle and thread guide are located outside of a winding carried by the support, towards the thread guide to enter the opening therein, means to turn the needle so that the opening of its hook faces towards the support, means to turn the thread guide to twist the thread around the needle, means to move the needle out of and away from the thread guide to form a first loop, means to advance the frame towards the support to a position where the needle and thread guide are located inside a winding carried by the support, the needle and thread guide passing during such movement on opposite sides of a winding carried by the support and the first loop being laid across one face of the winding, means to turn the needle about its axis so that the opening of its hook faces away from the axis of relation of the support, means to advance the needle through said first loop into the thread guide, means to turn the thread guide to twist the thread around the needle, means to withdraw the needle from the thread guide to form a second loop extending through the first loop and lying across the opposite face of the winding from the first loop, means to turn said support a predetermined distance, and means to retract the frame from the support to lay the second loop across the winding, further retracting movement of the needle tightening thhe first loop on the winding.

11. In a device as claimed in claim 10, means associated with the needle and operative during such retracting movement to cast off the first loop from the needle.

12. In a device as claimed in claim 11, said casting off means comprising a sleeve turnably and slidably mounted on said needle having a projection on the end nearest the hook.

13. In a device as claimed in claim 12, said needle having a notch in the side towards which the hook opening faces, said notch being further from the end of the needle than the hook.

14. In a device as claimed in claim 10, said needle having a notch in the side towards which the hook opening faces, said notch being further from the end of the needle than the hook.

15. Apparatus as defined in claim 1 further comprising a machine frame, two slide members slidable longitudinally on said frame and supporting said housings, means for mounting said stator receiving means on said frame, and means for reciprocating said slide members at predetermined intervals toward and away from said stator mounting means in accordance with said spacing between adjacent winding portions and the operation of said driving means, one of said longitudinal slide members being mounted on said machine frame at each side of said cross slide member, the means for reciprocating said longitudinal slide members operating at the same rhythm, but in phase opposition to each other.

References Cited in the file of this patent

UNITED STATES PATENTS

| | | |
|---|---|---|
| 289,077 | Doolittle et al. | Nov. 27, 1883 |
| 340,422 | Cornely | Apr. 20, 1886 |
| 437,083 | Bennett | Sept. 23, 1890 |
| 2,407,148 | Garcia | Sept. 3, 1946 |
| 2,465,665 | Slavek | Mar. 29, 1949 |
| 2,883,949 | Ammann | Apr. 28, 1959 |

FOREIGN PATENTS

| | | |
|---|---|---|
| 488,846 | Germany | Jan. 10, 1930 |